UNITED STATES PATENT OFFICE.

SIDNEY S. EMERY, OF WOODBURY, NEW JERSEY, ASSIGNOR TO THE EASTERN DYNAMITE COMPANY, OF WILMINGTON, DELAWARE, A CORPORATION OF NEW JERSEY.

PROCESS OF MANUFACTURING ALUMINATE OF SODA.

No. 818,754.　　　Specification of Letters Patent.　　　Patented April 24, 1906.

Application filed April 10, 1905. Serial No. 254,750.

*To all whom it may concern:*

Be it known that I, SIDNEY S. EMERY, a citizen of the United States, residing at Woodbury, county of Gloucester, and State of New Jersey, have invented a new and useful Improvement in Methods of Manufacturing Aluminate of Soda Free from Impurities from Sulfates of Soda and Bauxite, of which the following is a full, clear, and exact description.

I have discovered an improvement in the method of manufacturing aluminate of soda free from impurities from sulfates of soda and bauxite.

The specific object of my improvement is to produce an aluminate of soda free from any of the impurities originally present in or formed from the raw materials used.

The ordinary methods by which it has been attempted to manufacture aluminate of soda from sulfates of soda and native hydrate of alumina is to calcine an admixture of the sulfates of soda—for instance, salt cake fifty per cent. and bauxite forty per cent.—preferably with the addition of ten per cent. of some carbonaceous matter. The aluminate of soda is obtained from the resultant product by lixiviation. In the process as heretofore carried out the aluminate-of-soda solution has never been obtained free from impurities, there being present various sulfids of soda. In some cases it was attempted to form sulfid of iron instead of sulfid of soda; but this merely substituted one impurity for another. In all cases there were present one or more of the following impurities: sulfate of soda, sulfid of soda, ferrous sodium sulfid, ferrous sulfid. After considerable research I have discovered the cause of the presence of these impurities to be that during calcination the carbonaceous matter which is used reduces the sulfate of soda to sulfid of soda. The sulfid impurities thus formed are dissolved in the subsequent lixiviation along with the aluminate of soda. I have discovered that I can eradicate this difficulty and produce a pure aluminate of soda, if during calcination I supply an excess of air over that required for the combustion of the carbonaceous matter. Preferably I provide the excess of air by means of an air-blast. The action of this excess of air is as follows: Sulfates of soda when calcined with carbon, as ordinarily carried out, are reduced to sulfid of soda. If, however, an admixture of sulfates of soda, bauxite, and carbonaceous matter be calcined in the presence of an excess of air over that required for the complete combustion of the carbonaceous matter, the sulfates of soda are prevented from being reduced to sulfids and are reduced only to sulfites. These sulfites are decomposed by the alumina into aluminate of soda and $SO_2$, the latter passing off as a gas.

Having now fully described my invention, what I claim, and desire to protect by Letters Patent, is—

1. The hereinbefore-described method of producing an aluminate of soda, free from impurities, from bauxite and sulfates of soda, which consists in calcining an admixture of bauxite, sulfate of soda and carbonaceous matter in the presence of air in excess of that required for combustion.

2. The hereinbefore-described method of producing an aluminate of soda, free from impurities, from bauxite and sulfates of soda, which consists in calcining an admixture of bauxite, sulfate of soda and carbonaceous matter in the presence of an air-blast.

In testimony of which invention I have hereunto set my hand, at Woodbury, on this 24th day of March, 1905.

SIDNEY S. EMERY.

Witnesses:
　FRANCIS B. DAVIS,
　ALEXANDER L. ROGERS.